United States Patent
Watanabe

(10) Patent No.: US 7,818,589 B2
(45) Date of Patent: Oct. 19, 2010

(54) DATA TRANSFER APPARATUS AND IMAGE FORMING APPARATUS

(75) Inventor: Hideyuki Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 935 days.

(21) Appl. No.: 11/499,665

(22) Filed: Aug. 7, 2006

(65) Prior Publication Data

US 2007/0043884 A1    Feb. 22, 2007

(30) Foreign Application Priority Data

Aug. 19, 2005 (JP) .............................. 2005-238700
Aug. 19, 2005 (JP) .............................. 2005-238711
Jun. 7, 2006 (JP) .............................. 2006-158740

(51) Int. Cl.
*G06F 1/26* (2006.01)

(52) U.S. Cl. ................. 713/300; 713/310; 713/320; 713/321; 713/322; 713/323; 713/324; 713/330; 713/340

(58) Field of Classification Search .......... 713/300, 713/310, 320–324, 330, 340
See application file for complete search history.

(56) References Cited

U.S. PATENT DOCUMENTS

| 6,732,262 | B1 * | 5/2004 | Sakai ............................ 713/1 |
| 6,795,450 | B1 * | 9/2004 | Mills et al. .................. 370/463 |
| 7,286,042 | B2 * | 10/2007 | Perraud et al. ........... 340/10.33 |
| 7,574,615 | B2 * | 8/2009 | Weng et al. ................. 713/320 |
| 2002/0199026 | A1 * | 12/2002 | Tsunashima et al. ........ 709/250 |
| 2003/0156129 | A1 * | 8/2003 | Takahashi et al. ........... 345/700 |
| 2005/0275882 | A1 * | 12/2005 | Yasuda et al. ............. 358/1.15 |
| 2006/0082652 | A1 * | 4/2006 | Sugiyama ................ 348/207.1 |

FOREIGN PATENT DOCUMENTS

| JP | 11-85420 | 3/1999 |
| JP | 2000-10907 | 1/2000 |
| JP | 2002-111927 | 4/2002 |
| JP | 2005-65216 | 3/2005 |

* cited by examiner

*Primary Examiner*—Abdelmoniem Elamin
(74) *Attorney, Agent, or Firm*—Oblon, Spivak, McClelland, Maier & Neustadt, L.L.P.

(57) ABSTRACT

A data transfer apparatus has a plurality of data transfer interfaces, and one of the plurality of data transfer interfaces has a PHY, the PHY being made in a reset state when the data transfer interface is not used.

2 Claims, 4 Drawing Sheets

DATA TRANSFER APPARATUS AND IMAGE FORMING APPARATUS

BACKGROUND OF THE INVENTION

1. Field of the Invention

The present invention relates to energy saving of a data transfer apparatus as a network interface for a printer, a copier, a MFP (multi-function peripheral) or such, and in particular, to a data transfer apparatus carrying out energy saving control and an image forming apparatus employing such a data transfer apparatus.

2. Description of the Related Art

As a system considering power saving, Japanese Laid-open Patent Applications Nos. 11-085420 and 2002-111927 disclose related arts. Japanese Laid-open Patent Application No. 11-085420 discloses a printing system in which a host apparatus and a printing apparatus connected with the host apparatus via a communication network are provided, and the printing apparatus receives printing data from the host apparatus and prints out the same. In this system, the host apparatus is connected with the printing apparatus in a bi-directional communication manner; the printing apparatus has a means for entering a power saving mode after an elapse of a predetermined time period, a means for releasing from the energy saving mode when receiving transmission data from the host apparatus, a means for obtaining energy saving setting time information based on energy saving status information obtained in the bi-directional communication manner, and a means for transmitting corresponding information to the host apparatus instantaneously when entering the energy saving mode. The host apparatus has an application tool started up in the host apparatus for producing image data to transmit to the printing apparatus, an operation panel displaying a button for releasing from the energy saving mode on a page of the application, and a means for transmitting data to the side of the printing apparatus for releasing it from the energy saving mode in response to an instruction input from the releasing button. In this system, from a time at which the releasing button is pressed, a time period is calculated, the host apparatus recognizes a setting time based on the setting time information for entering the energy saving mode, and re-displays the releasing button on the operation panel before the above-mentioned time has elapsed.

Japanese Laid-open Patent Application No. 2002-111927 discloses a facsimile apparatus including a facsimile communication part carrying out facsimile communication via a public communication line, and a LAN (Local Area Network) interface part carrying out communication by means of electronic mails via the LAN. The LAN interface part has a control means, switching thereof of which is available between a regular operation mode in which a program is operated at a regular clock frequency and communication is carried out between the facsimile communication part and the LAN; and a low power mode in which the clock signal is stopped, and the program is halted. The control means is switched into the low power mode when, in the regular operation mode, a series of processing operation is finished, and then, is switched into the regular operation mode when a stating-up signal is received from the LAN or the facsimile communication part.

In the above-mentioned system disclosed by Japanese Laid-open Patent Application No. 11-085420, once the host is informed that the printing apparatus enters the energy saving mode, and then, when the energy saving releasing button is pressed from the host, the energy saving releasing data is transmitted to the printing apparatus for releasing from the energy saving mode. In this configuration, an application for carrying out the energy saving control is required on the host side.

In the above-mentioned system disclosed by Japanese Laid-open Patent Application No. 2002-111927, the facsimile apparatus automatically enters the regular operation mode from the energy saving mode when the started-up signal is received from the LAN I/F part. In this system, since the starting-up signal has an IP address of the facsimile apparatus itself, the facsimile apparatus is released from the energy saving mode into the regular operation mode when receiving any packet directed to the facsimile apparatus itself regardless of the actual contents of the packet. Accordingly, the energy saving effect may not substantially work.

An image forming apparatus such as a printer, a copier, an MFP or such, is required to be configured so that, it can be directly connected to an external apparatus such as a PC (personal computer). For this purpose, such an apparatus has an interface for being connected to the external apparatus such as a PC for when the necessity arises.

The above-described system disclosed by each of Japanese Laid-open Patent Applications Nos. 11-085420 and 2002-111927 is configured for energy saving for a case where the printing apparatus or the facsimile apparatus is always connected to the external apparatus via the communication network. However, these systems may not be configured in consideration of such a situation that energy saving should be carried out even in an apparatus having an interface prepared for being connected to the external apparatus such as a PC for when the necessity arises.

SUMMARY OF THE INVENTION

The present invention has been devised in consideration of the above-mentioned situation, and an object of the present invention is to provide a data transfer apparatus in which energy saving is carried out in the data transfer apparatus acting as an interface for being connected to the external apparatus such as a PC prepared for when the necessity arises, and an image forming apparatus employing the data transfer apparatus.

According to a first aspect of the present invention, a data transfer apparatus includes: a plurality of data transfer interfaces, wherein one of the plurality of data transfer interfaces has a PHY, and the PHY enters a reset state when the data transfer interface is not used.

According to a second aspect of the present invention, in the first aspect of the present invention, the PHY of the data transfer interface may have a PLL, and operation of the PLL is stopped when the data transfer interface is not used.

According to a third aspect of the present invention, in any one of the first and second aspects of the present invention, one of the plurality of data transfer interfaces may have a serial data interface.

According to a fourth aspect of the present invention, in the third aspect of the present invention, the serial data interface may have a USB interface.

According to a fifth aspect of the present invention, in the fourth aspect of the present invention, the USB interface may have a USB operation mode enter a suspended state, and may stop operation of the PLL, when the data transfer interface is not used.

According to a sixth aspect of the present invention, an image forming apparatus includes: the data transfer apparatus according to any one of the first through fifth aspects of the present invention; and an image forming part forming a visible image on a recording medium based on input data.

According to a seventh aspect of the present invention, a data transfer apparatus includes: a data transfer interface, which is connectable to an external apparatus and the connection with the external apparatus is recognizable, wherein the data transfer interface has a PHY, and the PHY enters a reset state when the data external apparatus is not connected to the data transfer interface.

According to an eighth aspect of the present invention, in the seventh aspect of the present invention, the PHY of the data transfer interface may have a PLL, and operation of the PLL is stopped when the data transfer apparatus is not connected to the external apparatus.

According to a ninth aspect of the present invention, in the seventh or the eighth aspect of the present invention, the data transfer interface may have a serial data interface.

According to a tenth aspect of the present invention, in the ninth aspect of the present invention, the serial data interface may have a USB interface.

According to an eleventh aspect of the present invention, in the tenth aspect of the present invention, the USB interface may have a USB operation mode enter a suspended state, and may stop operation of the PLL when the external apparatus is not connected to the USB interface.

According to a twelfth aspect of the present invention, in the seventh or the eighth aspect of the present invention, the data transfer interface may have a network interface.

According to a thirteenth aspect of the present invention, an image forming apparatus includes: the data transfer apparatus according to any one of the seventh through twelfth aspect of the present invention; and an image forming part forming a visible image on a recording medium based on input data.

In the above-mentioned configuration according to the present invention, control is made such that, when the external apparatus is not connected, PHY included in the data transfer interface in the data transfer apparatus is reset, and also, operation of PLL included in PHY is stopped. Accordingly, it is possible to avoid actual use of energy (power consumption) when the external apparatus is not connected, and thus, energy saving effect can be positively obtained.

Other objects and further features of the present invention will become more apparent from the following detailed description when read in conjunction with the accompanying drawings:

DETAILED DESCRIPTION OF THE PREFERRED EMBODIMENT

A data transfer apparatus and an image forming apparatus employing the data transfer apparatus in one embodiment of the present invention will now be described with reference to the figures.

Figure 1:
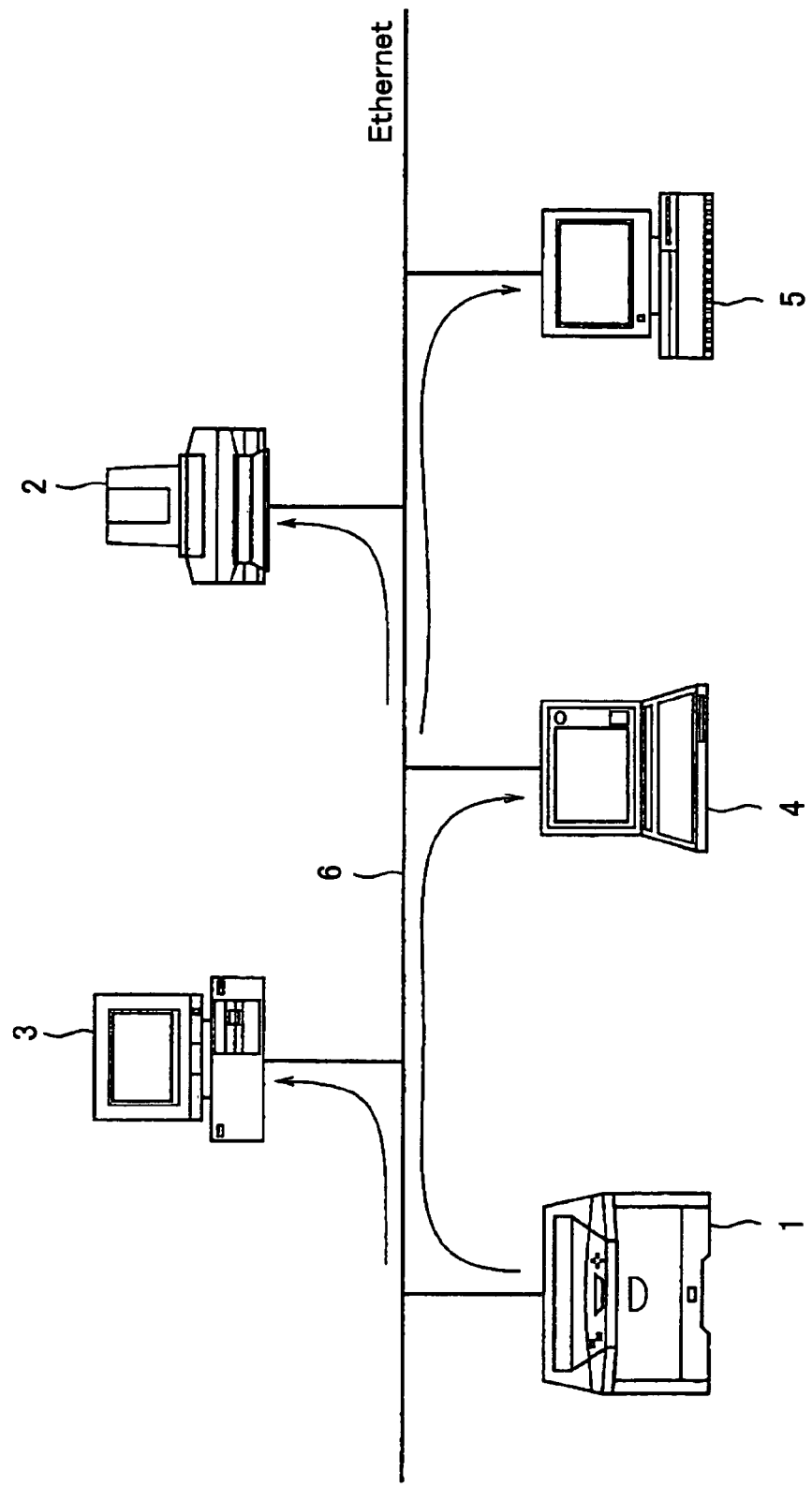
FIG. 1 shows a configuration of a network system to which the present invention is applicable.

FIG. 1 shows a configuration of a network system to which the present invention is applied. As shown, the network system to which the present invention is applied includes an image forming apparatus (multi-function machine) 1 having a plurality of functions such as a copier, a printer and so forth; a printer 2; and PCs (personal computers) 3, 4 and 5, which are connected together by means of a communication network 6. Each of the PC 3, 4 and 5 uses the image forming apparatus 1 or the printer 2. The actual number of the multi-function machine 1, the printer 2 and the PCs 3, 4 and 5 is merely an example, and the present invention may be applied in the same way even for a system including a larger number of these machines connected together, or for a system including a less number of these machines connected together. In this example of FIG. 1, any of the PCs 3, 4 and 5 may send a printing instruction to the image forming apparatus 1 or the printer 2, and therewith, may cause the printer 2 to print out corresponding information. As the communication network 6, Ethernet (registered trademark) is applied as one example Each of the image forming apparatus 1 and the printer 2 includes an image forming unit 500 (see FIG. 2) having a well-known configuration in an electrophotographic system or an ink jet system. Since an image forming apparatus or a printer in such a system is well-known, description of the details of the mechanical structure and the electric configuration of the image forming part 500 is omitted. Further, each of the image forming apparatus 1 and the printer 2 includes a data transfer apparatus acting as an interface for connecting to an external apparatus, for when the necessity arises, such as a carriable PC, a portable PC, a PDA or such, and also, has a connector required for connecting to such an external apparatus.

Figure 2:
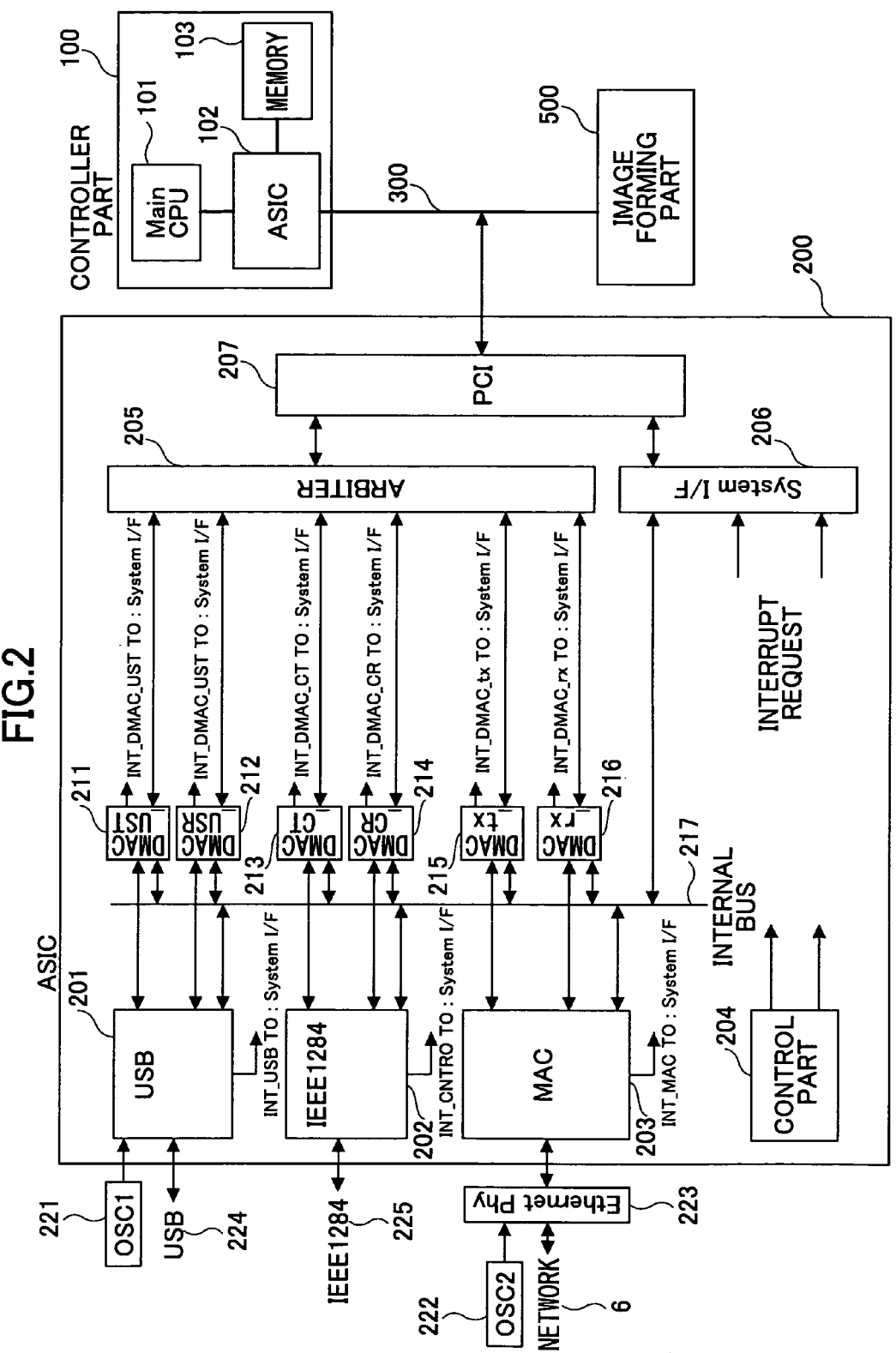
FIG. 2 shows a block diagram of a configuration of a control part of an image forming apparatus according to one embodiment of the present invention.

FIG. 2 shows a block diagram of a control part of the image forming apparatus 1 of FIG. 1. The image forming apparatus of FIG. 2 has a controller part 100, an interface part (interface ASIC) 20b (acting as the above-mentioned data transfer apparatus), and a PCI bus 300 connecting therebetween.

The controller part 100 includes a main CPU 101, an ASIC (application specific integrated circuit) 102, a memory 103 and an HDD (not shown) storing image data transmitted thereto via the communication network 6 of FIG. 1. The main CPU 101, the memory 103 and the HDD (not shown) are connected to the ASIC 102, respectively, and the ASIC 102 is connected to the PCI bus 300. The main CPU 101 controls the above-mentioned image forming part 500, and the ASIC 102 controls input/output of data to the memory and the HDD transmitted thereto via the communication network.

The interface ASIC 200 includes a USB block 201 acting as a data transfer interface which is a serial interface; an IEEE 1284 block 202; a MAC (media access control) block 203; a control part 204; an arbiter 205; a system interface (system I/F) 206; a PCI 207; and various sorts of DMACs (direct memory access controllers) 211 through 216.

The USB block 201 has an oscillator 220 connected thereto, and may have the above-mentioned external apparatus and so forth, connected thereto via a USB 224. The USB block 210 is connected to an internal bus 217, a DMAC. UST 211 and a DMAC. USR 212, and further, is connected to the system interface 206.

The IEEE 1284 block 202 may have the above-mentioned external apparatus connected thereto via an IEEE 1284 line 225, is connected to the internal bus 217, a DMAC. CT 213 and a DMAC. CR 214, and further, is connected to the system interface 206.

The MAC block 203 has an oscillator 222 and the communication network 6 connected thereto via an Ethernet physical layer (Ethernet Phy) 223, is connected to the internal bus 217, a DMAC. tx 215 and a DMAC. rx 216, and further, is connected to the system interface 206.

The above-mentioned DMACs 211 through 216 are connected to the internal bus 217, is connected to the arbiter 205 which carries out arbitration of connection states, and is further connected to the system interface 206.

The system interface 206 has the above-mentioned connections, and also is connected to the internal bus 217 and to the PCI 207. The arbiter 205 has the above-mentioned connections, and also, is connected to the PCI 207. The PCI 207 is connected to the controller part 100 via the PCI bus 300.

When the image forming apparatus 1 having the control part described above in the embodiment of the present invention is connected in the network system such as that shown in FIG. 1, and a printing instruction is given thereto via the communication network 6 from any one of the PCs 3, 4 and 5, a control for transmission/reception of printing data and so forth is carried out by means of the controller part 100 via the MAC block 203, the DMAC. tx 215, the DMAC. rx 216, the arbiter 205 and the PCI 207, and the controller part 100 then transmits the instructions to the above-mentioned image forming part (printing unit) 500 which then carries out the corresponding printing operation according to the instructions.

Also in a case where a printing instruction is given by the external apparatus connected to the above-mentioned USB 224 or in a case where a printing instruction is given by the external apparatus connected to the above-mentioned IEEE 1284 line 225, a control of transmission/reception of printing data and so forth is carried out by means of the controller part 100 of the image forming apparatus 1 in the embodiment of the present invention via the USB block 201 or the IEEE 1284 block 202 in the same manner, and the controller part 100 then transmits the instructions to the image forming part (printing unit) 500 which then carries out the corresponding printing operation according to the instructions.

Figure 3:
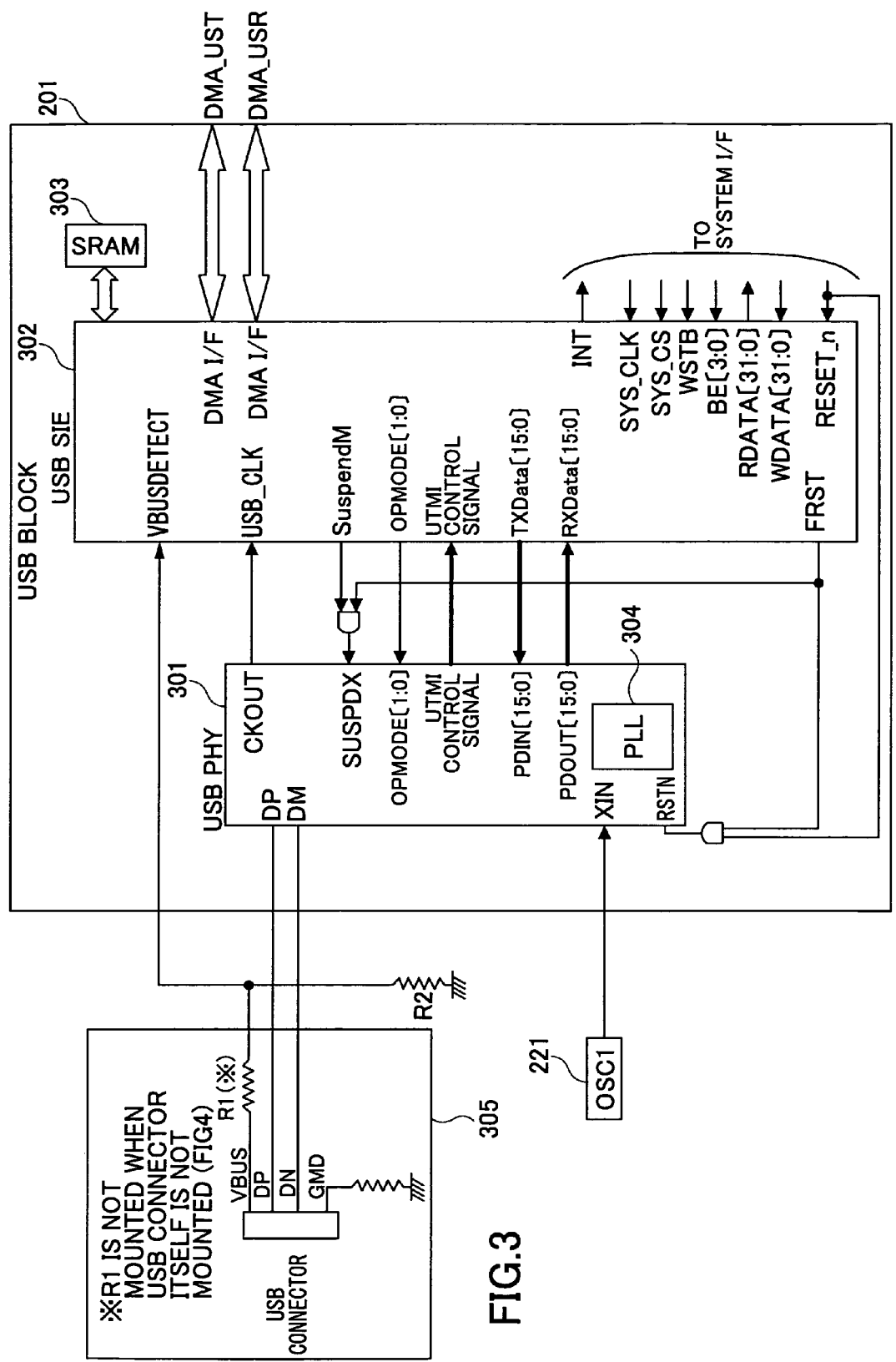
FIG. 3 shows a block diagram of a configuration of a USB block included in the control part shown in FIG. 2.

FIG. 3 shows a block diagram of the USB block 201. As shown, the USB block 201 includes a USB physical layer (referred to as 'USB PHY', hereinafter) 301; a USB SIE (Serial Interface Engine) 302; and a SRAM 303 connected to the USB SIE 303. To the USB block 201, a USB connector 305 for connecting to the USB 224 (see FIG. 2) is connected, and also, the above-mentioned oscillator 221 is connected. Further, the USB PHY 301 includes a PLL 304 to generate a clock signal at a predetermined frequency from a clock signal provided from the oscillator 221. The PLL generates the clock signal required for transmission/reception of data with the external apparatus connected to the USB connector by means of the USB 224.

The USB block 201 configured as described above is configured in such a manner that it is possible to recognize whether or not the external apparatus is connected via the connector 305, i.e., whether the USB block 201 is actually used or is not used. For this purpose, the USB SIE 302 has a terminal VBUSDETECT for receiving a signal VBUS indicating that the external apparatus is connected when the external apparatus is actually connected to the USB connector 305 (described later). The USB SIE 302 activates a SuspendM signal applied to the USB PHY 301 when the external apparatus is not connected to the USB connector 305 detected from the signal thus received at the VBUSDETECT terminal. In response thereto, the USB PHY 301 stops operation of the PLL 304, and also, the USB PHY 301 itself enters a reset state. Thus, during a time period in which the USB block 201 is not actually used, power consumption therein can be effectively reduced.

In details, when the external apparatus is connected to the USB connector 305 (see FIG. 3), a voltage of, typically 5 volts, is applied to the terminal VBUS (shown in the figure) of the USB connector 305 from the external apparatus, which voltage is a power supply voltage in the external apparatus. The voltage thus applied to the VBUS terminal is then applied to the above-mentioned terminal VBUSDETECT of the USB SIE 302 via a voltage dividing circuit of resistors R1 and R2. The resistors R1, R2 are connected in series as shown, one end of the resistor R2 is grounded, and the divided voltage is applied to the terminal VBUSDETECT from the connection point between the resistors R1, R2. For example, when the resistance values of the resistors R1 and R2 are set so that they have the ratio of 1:2, the voltage of 3.3 volts is applied to the VBUSDETECT terminal when the external apparatus is connected to the USB connector 305. As a result of this voltage being thus applied to the VBUSDETECT terminal, the USB SIE 302 recognizes that the external apparatus is thus connected.

On the other hand, when the external apparatus is not connected to the USB connector 305, no voltage is applied to the VBUS terminal of the USB connector 305 by the external apparatus, and thus, the ground voltage (0 volts) is applied to the VBUSDETECT terminal of the USB SIE 302 via the resistor R2. Thereby, the USB SIE 302 recognizes that the external apparatus is not connected as a result of the ground voltage being thus applied to the VBUSDETECT terminal of the USB SIE 302.

In the above description, whether or not the external apparatus is connected to the USB connector 305 is recognized in a state in which the external apparatus is in a usable state, i.e., the power supply voltage is active in the external apparatus. Further, when the external apparatus is connected to the USB connector 305 in a state in which the power supply is turned off in the external apparatus, and thus no voltage is actually applied to the VBUS terminal of the USB connector 305, the USB SIE 302 recognizes that the external apparatus is not connected in the manner same as that described above as a result of the no voltage being thus actually applied to the VBUS terminal of the USB connector 305.

Figure 4:
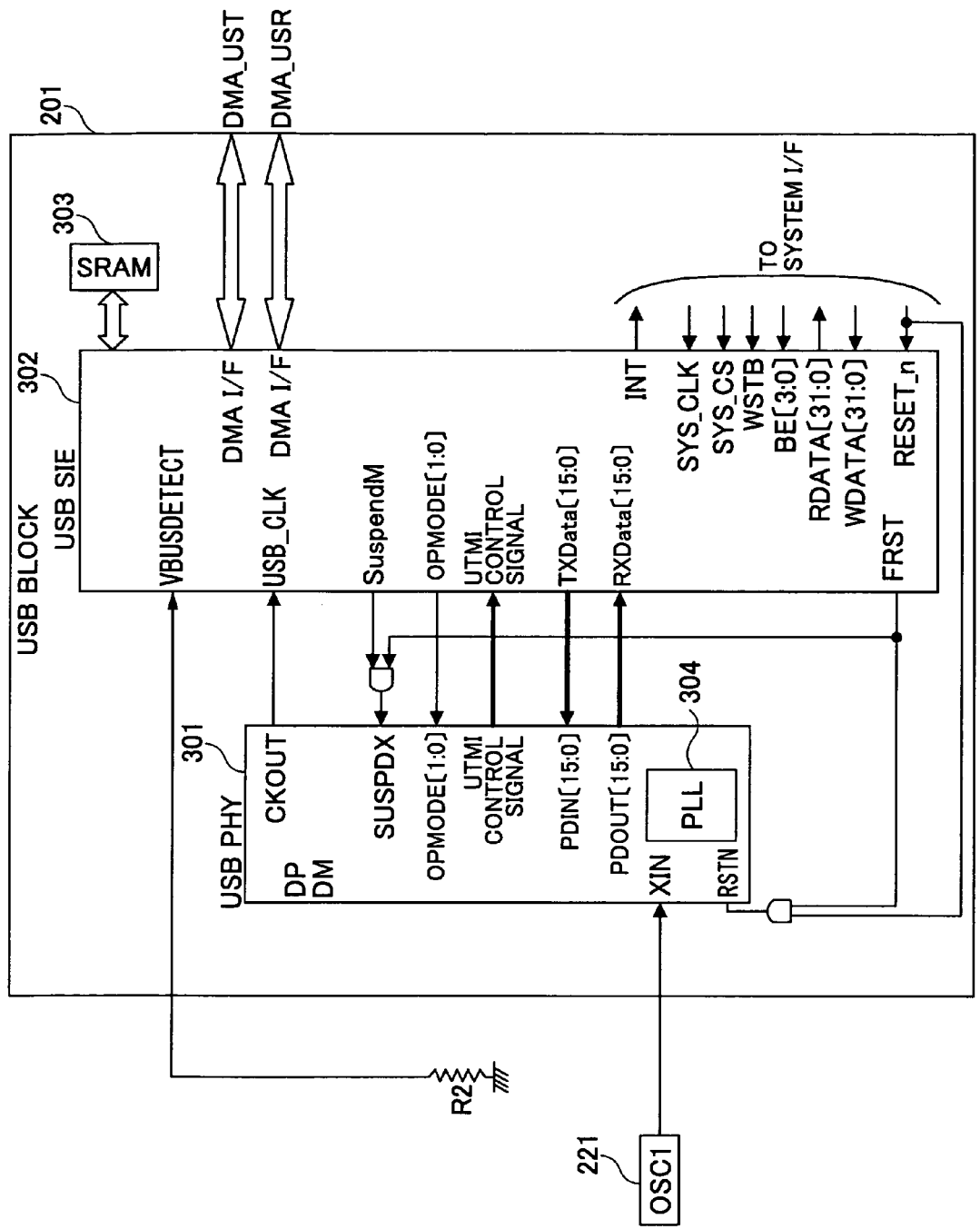
FIG. 4 shows a block diagram of a configuration of the USB block included in the control part shown in FIG. 2, in another case in which a USB connector is not mounted.

Further, in order to reduce the cost of the image forming apparatus 1 including the data transfer apparatus in the embodiment of the present invention, the USB connector 305 may not be mounted therein in another case. FIG. 4 shows this case. Also in this case, generally, the ASIC 200 of FIG. 2 having the same configuration as that, for the case where the USB connector 305 is mounted, is provided, for the purpose of reducing the cost of the data transfer apparatus as a result of the data transfer apparatus 200 being thus made to have a common configuration for various possible cases including the above-mentioned case of omitting the USB connector 305.

In the embodiment of the present invention, even in the case where the USB connector 305 is not actually mounted, in the manner same as that described above, it is possible to automatically recognize the state in which the external apparatus is not connected. That is, in the embodiment of the present invention, even in the case where the USB connector 305 is not mounted, the resistor R2 is connected to the VBUSDETECT terminal of the USB SIE 302 in the same manner as shown in FIG. 4. Accordingly, in this case, the ground voltage (0 volts) is applied to the VBUSDETECT terminal of the USB SIE 302 via the resistor R2. As a result, the operation same as that carried out when the external apparatus is not connected to the USB connector 305 in the case of FIG. 3, is carried out.

As described above, in the USB block 201, the USB PHY 301 enters the reset state, and also, operation of the PLL 304 is stopped when any one of the above-described three states occurs, i.e., a state in which the external apparatus is not connected to the USB connector 305; a state in which the power supply in the external apparatus is turned off even when the external apparatus is connected to the USB connector; and a state in which the USB connector is not mounted (FIG. 4), and thus, the data transfer interface is not actually used. As a result, it is possible to eliminate power consumption as mentioned above. This state is then released from by the USB SIE 302 immediately when the external apparatus is connected to the USB connector 305 in the state in which the power supply is active; the power supply in the external apparatus connected to the USB connector 305 is turned on; or the USB connector 305 is newly provided and the external apparatus is connected thereto. Accordingly, when the external apparatus is connected in the state in which the power supply is active or the power supply in the external apparatus connected to the USB connector 305 is turned on, the USB PHY 301 immediately enters an active state, and thus, the image forming apparatus 1 comes to be able to responds to a printing instruction from the external apparatus to carry out the corresponding printing operation.

Further, the present invention is not limited to the above-described embodiment, and variations and modifications may be made without departing from the basic concept of the present invention claimed below.

The present application is based on Japanese Priority Applications Nos. 2005-238700, 2005-238711 and 2006-158740, field on Aug. 19, 2005, Aug. 19, 2005 and Jun. 7, 2006, respectively, the entire contents of which are hereby incorporated herein by reference.

What is claimed is:

1. A data transfer apparatus, comprising:
  a plurality of data transfer interfaces, one of the plurality of data transfer interfaces comprising a PHY, the PHY being made to enter a reset state when the one of the plurality of data transfer interfaces is not used;
  a voltage dividing circuit provided to a terminal of a USB connector; and
  a detector configured to detect whether the one of the plurality of the data transfer interfaces is used based on a voltage from the voltage dividing circuit, wherein the voltage from the voltage dividing circuit changes according to whether an external apparatus is connected to the USB connector, whether power supply is turned on in the external apparatus in a condition where the external apparatus is connected to the USB connector, and whether the USB connector is mounted.

2. The data transfer apparatus of claim 1, wherein the voltage dividing circuit comprises a first resistor and a second resistor.

* * * * *